United States Patent
Park (10) Patent No.: US 8,761,691 B2
(45) Date of Patent: Jun. 24, 2014

(54) METHOD OF PROVIDING USER INTERFACE AND MOBILE TERMINAL USING THE SAME

(75) Inventor: Young Sik Park, Daegu (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 377 days.

(21) Appl. No.: 12/635,835

(22) Filed: Dec. 11, 2009

(65) Prior Publication Data

US 2010/0151913 A1    Jun. 17, 2010

(30) Foreign Application Priority Data

Dec. 11, 2008 (KR) ........................ 10-2008-0125921

(51) Int. Cl.
*H04B 1/38* (2006.01)
*H04M 1/00* (2006.01)

(52) U.S. Cl.
USPC ...... 455/90.3; 455/90.1; 455/566; 455/575.1; 345/88; 345/156; 345/157; 345/158; 345/173; 356/364; 367/111; 708/142; 715/863

(58) Field of Classification Search
CPC ....... H01Q 1/243; H04B 1/3833; H04B 1/385
USPC ......... 455/903, 566, 575.1, 575.3, 90.1, 90.3; 345/157, 173, 156, 619
See application file for complete search history.

(56) References Cited

U.S. PATENT DOCUMENTS

| | | | | |
|---|---|---|---|---|
| 5,517,309 A | * | 5/1996 | Barker | 356/364 |
| 5,537,380 A | * | 7/1996 | Sprankle et al. | 367/111 |
| 5,825,675 A | * | 10/1998 | Want et al. | 708/142 |
| 6,073,033 A | * | 6/2000 | Campo | 455/566 |
| 6,658,272 B1 | * | 12/2003 | Lenchik et al. | 455/575.1 |
| 6,839,576 B2 | * | 1/2005 | Aagaard et al. | 455/575.1 |
| 7,006,074 B2 | * | 2/2006 | Chesters | 345/156 |
| 7,190,351 B1 | * | 3/2007 | Goren | 345/173 |
| 7,239,898 B2 | * | 7/2007 | Lenchik et al. | 455/575.1 |
| 7,257,430 B2 | * | 8/2007 | Lenchik et al. | 455/575.3 |
| 7,406,666 B2 | * | 7/2008 | Davis et al. | 715/863 |
| 2002/0102946 A1 | * | 8/2002 | SanGiovanni | 455/90 |
| 2003/0058255 A1 | * | 3/2003 | Yamagishi | 345/619 |
| 2004/0046732 A1 | * | 3/2004 | Chesters | 345/156 |
| 2004/0067783 A1 | * | 4/2004 | Lenchik et al. | 455/575.1 |
| 2004/0127266 A1 | * | 7/2004 | Aagaard et al. | 455/575.1 |
| 2004/0203485 A1 | * | 10/2004 | Lenchik et al. | 455/90.1 |

(Continued)

FOREIGN PATENT DOCUMENTS

JP        2008-131616        6/2008

*Primary Examiner* — William D Cumming
(74) *Attorney, Agent, or Firm* — Cha & Reiter, LLC (57) ABSTRACT

A method of providing a user interface according to a user characteristic and a mobile terminal using the same are provided. The mobile terminal includes: a display unit for displaying data on a screen thereof with different screen sizes corresponding to a horizontal mode and a vertical mode; an input unit for providing different input key arrangements corresponding to the vertical mode, a left hand horizontal mode, and a right hand horizontal mode; a detection unit for detecting a mode conversion between the horizontal mode and the vertical mode and a mode conversion between the left hand horizontal mode and the right hand horizontal mode; and a controller for controlling to display data to correspond to a screen size corresponding to the detected mode and to provide a corresponding input key arrangement.

13 Claims, 6 Drawing Sheets

(56) References Cited

U.S. PATENT DOCUMENTS

| | | |
|---|---|---|
| 2005/0136853 A1* | 6/2005 | Lenchik et al. ............ 455/90.3 |
| 2006/0152487 A1* | 7/2006 | Grunnet-Jepsen et al. ... 345/158 |
| 2006/0152488 A1* | 7/2006 | Salsman et al. ............. 345/158 |
| 2006/0152489 A1* | 7/2006 | Sweetser et al. ............ 345/158 |
| 2009/0007025 A1* | 1/2009 | Davis et al. ................. 715/863 |
| 2009/0170566 A1* | 7/2009 | Kwon et al. ................. 455/566 |
| 2009/0286575 A1* | 11/2009 | Taniguchi et al. .......... 455/566 |
| 2010/0103127 A1* | 4/2010 | Park et al. ................... 345/173 |
| 2010/0151913 A1* | 6/2010 | Park ............................ 455/566 |
| 2010/0156774 A1* | 6/2010 | Broughton et al. .......... 345/88 |
| 2010/0302148 A1* | 12/2010 | Tanabe et al. .............. 345/157 |

\* cited by examiner

METHOD OF PROVIDING USER INTERFACE AND MOBILE TERMINAL USING THE SAME

CLAIM OF PRIORITY

This application claims the benefit of the earlier filing date, pursuant to 35 USC §119, to that patent application entitled "METHOD OF PROVIDING USER INTERFACE AND MOBILE TERMINAL USING THE SAME" filed in the Korean Intellectual Property Office on Dec. 11, 2008 and assigned Serial No. 10-2008-0125921, the contents of which are incorporated herein by reference.

BACKGROUND OF THE INVENTION

1. Field of the Invention

The present invention relates to the field of mobile terminals, and more particularly, to a method of providing a user interface according to a user characteristic and a mobile terminal using the same.

2. Description of the Related Art

As wireless communication technology develops, mobile terminals become more widely used and thus communication service providers and manufacturers of mobile terminals provide various services and functions for satisfying requests of users.

For example, in addition to providing a communication service regardless of time and location, services such as a wireless Internet service, short message service (SMS), multimedia messaging service (MMS), a multimedia service, such as displaying an image and a moving picture, and a digital media broadcasting (DMB) service are provided by mobile terminals. Further, mobile terminals having additional features according to other known provided services, such as two display units, a display unit for displaying variable aspect ratios, a touch screen, a camera unit, and a DMB receiver, are also commonly available to the general public.

In consideration of users' convenience and satisfaction, the different forms of mobile terminals provide user interfaces according to the kinds of functions requested be executed by a user. For example, with a mobile terminal having a display unit in which a vertical dimension is different than that of a horizontal dimension, when performing voice communication, a voice communication service may be provided in a vertical display mode of the display unit in which the vertical dimension thereof is greater than the horizontal dimension, and when viewing DMB, a DMB service may be provided in a horizontal display mode of the display unit in which the horizontal dimension thereof is greater than the vertical dimension. However, instead of uniformly providing a service requested by a user according to a predetermined specific function, such as that described above, a method of providing a requested service by an interface set by a user according to the user's individual characteristic is required.

SUMMARY OF THE INVENTION

In accordance with an aspect of the present invention, a method of providing a user interface in a mobile terminal includes: detecting a mode conversion between a horizontal mode and a vertical mode in the mobile terminal, wherein the horizontal mode and vertical mode are classified according to a screen size of a display unit of the mobile terminal and an arrangement of input keys of the mobile terminal; determining, if the mode of the mobile terminal is converted from the vertical mode to the horizontal mode, whether the mode conversion of the mobile terminal is a conversion to a left hand horizontal mode or to a right hand horizontal mode, wherein the left hand horizontal mode and right hand horizontal mode are classified according to the input key arrangement; and providing the input key arrangement corresponding to one of the left hand horizontal mode and the right hand horizontal mode according to the determined mode conversion and displaying data to correspond to the screen size of the display unit in the horizontal mode.

In accordance with another aspect of the present invention, a mobile terminal includes: a display unit for displaying data on a screen thereof with different screen sizes corresponding to a horizontal mode and a vertical mode; an input unit for providing different input key arrangements corresponding to the vertical mode, a left hand horizontal mode, and a right hand horizontal mode; a detection unit for detecting a mode conversion between the horizontal mode and the vertical mode and a mode conversion between the left hand horizontal mode and the right hand horizontal mode; and a controller for controlling to display data to correspond to a screen size corresponding to the detected mode and to provide a corresponding input key arrangement.

BRIEF DESCRIPTION OF THE DRAWINGS

The above features and advantages of the present invention will be more apparent from the following detailed description in conjunction with the accompanying drawings, in which.

DETAILED DESCRIPTION OF THE INVENTION

Exemplary embodiments of the present invention are described in detail with reference to the accompanying drawings. The same reference numbers are used throughout the drawings to refer to the same or like parts. The views in the drawings are schematic views only, and are not intended to be to scale or correctly proportioned. For the purposes of clarity and simplicity, detailed descriptions of well-known functions and structures incorporated herein may be omitted to avoid obscuring the subject matter of the present invention.

In order to provide a requested service with an interface according to a user's individual characteristic, the present invention provides different Physical User Interfaces (hereinafter, 'PUI') and User Interfaces (hereinafter, 'UI') according to a hand that a user prefers to use. That is the interfaces may be determined according to whether a person is right-handed or left-handed, among user's individual characteristics. Hereinafter, both a PUI and a UI are referred to as a UI. Here, a right-handed person indicates a user characteristic of a user manipulating the mobile terminal 100 mainly using the right hand, while a left-handed person indicates a user characteristic of a user manipulating the mobile terminal 100 mainly using the left hand.

In the present invention, as an example of a UI provided according to a user's characteristic, a screen size of a display unit for displaying data and an arrangement of input keys of an input unit are described in detail with reference to the drawings.

In the following description, in a mobile terminal having a display unit in which a horizontal dimension of a screen of the display unit is different than that of a vertical dimension of the display unit, a state where the display unit screen is orientated such that the horizontal dimension is greater than that of the vertical dimension is referred to as a 'horizontal mode', and a state where the display unit screen is orientated such that the vertical dimension is greater than that of the horizontal dimension is referred to as a 'vertical mode'.

Figure 1A:
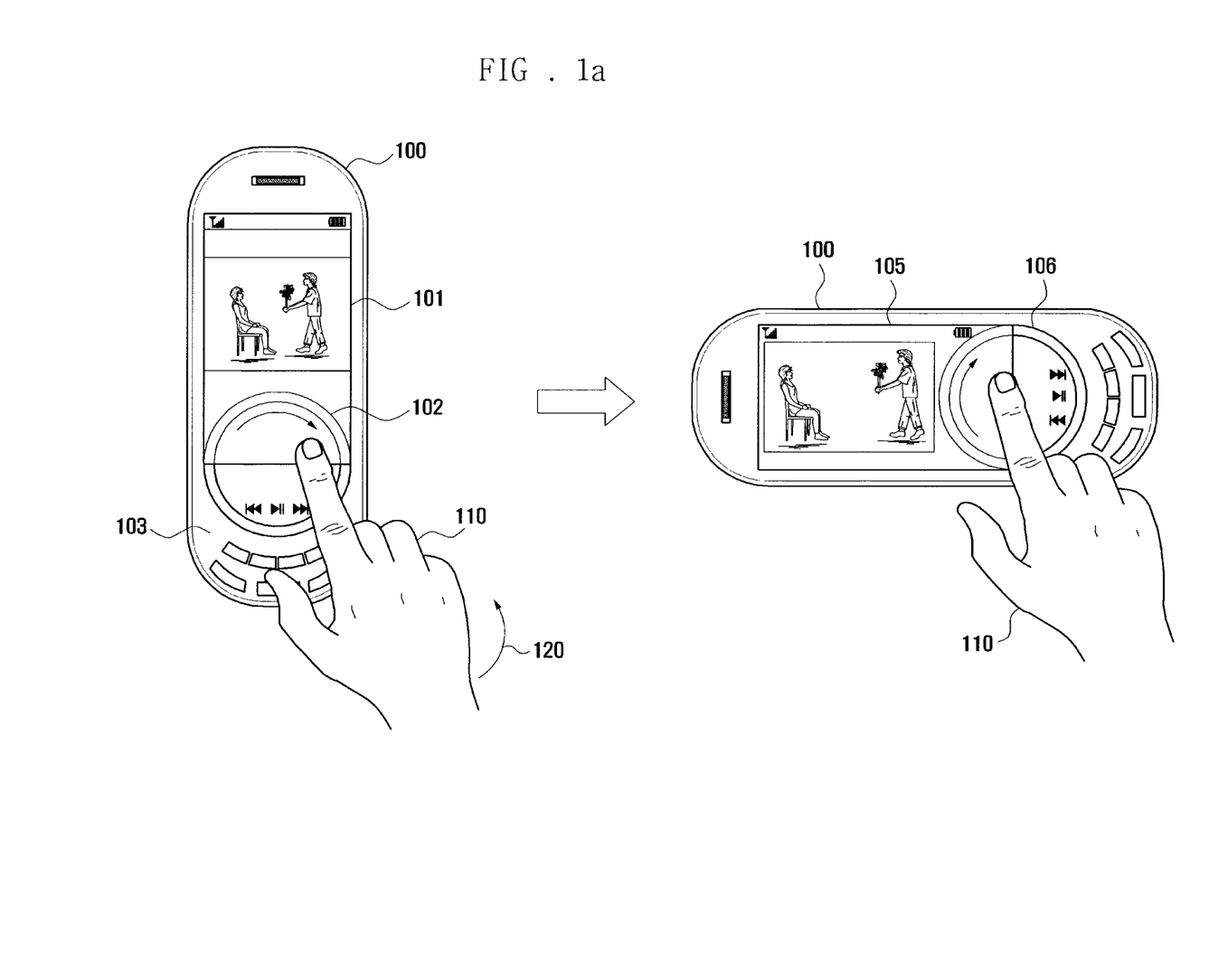
FIG. 1A illustrates an example of converting a user interface corresponding to a user characteristic of a right-handed person according to an exemplary embodiment of the present invention.

FIG. 1A illustrates an example of converting a UI corresponding to a user characteristic of a right-handed person according to an exemplary embodiment of the present invention.

Referring to FIG. 1A, a screen size of a display unit and input key arrangement of a mobile terminal 100 differ according to whether the mobile terminal 100 is positioned in a horizontal mode or a vertical mode (i.e., an orientation). In FIG. 1A, the mobile terminal 100 is converted from a state in which data is displayed in a display unit 101 of a vertical mode and input keys 102 of a vertical mode are arranged in a vertical arrangement, to a state in which data is displayed in a display unit 105 of a horizontal mode and input keys 106 of a horizontal mode are arranged in a horizontal arrangement, according to an orientation conversion.

Referring to FIG. 1A, the mobile terminal 100 in a vertical mode displays data generated while a requested application is executed to correspond to a screen size of the vertical mode display unit 101 and provides the input keys 102 to correspond to a vertical mode input key arrangement. In this case, the vertical mode input keys 102 can be arranged in a part of the display unit 101 as well as in a touch pad area 103 having input keys according to the executed application. The touch pad area 103 can have various keys in addition to the vertical mode input keys 102. Thus, the input keys are arranged in a known relationship to the display.

FIG. 1A illustrates a case of reproducing a music video as an example of an executed application, in which the mobile terminal 100 is operated in a vertical mode by a right-handed user 110. In a state where data of a music video is displayed through the vertical mode display unit 101 and the vertical mode input keys 102 are arranged, if the mobile terminal 100 is moved to a horizontal orientation in a moving direction 120, the mobile terminal 100 detects the moving direction 120 and converts the mode to a horizontal mode accordingly. That is, data of a music video that was reproduced through the vertical mode display unit 101 in the vertical mode of the mobile terminal 100 prior to the mode conversion is reproduced through the horizontal mode display unit 105, and the mobile terminal 100 converts the arranged vertical mode input keys 102 to an arrangement of the horizontal mode input keys 106. In this case, the mobile terminal 100 determines that the moving direction 120 to display data corresponds to a user characteristic of a right-handed user 110, and arranges the input keys 106 accordingly. When the detected moving direction of the mobile terminal is counterclockwise, as in the moving direction 120 in FIG. 1A, the mobile terminal 100 determines that the user is the right-handed user 110, and when the detected moving direction of the mobile terminal 100 is clockwise, the mobile terminal 100 determines that the user is a left-handed user.

When the mode of the mobile terminal 100 is converted to the horizontal mode, the mobile terminal 100 converts data of a music video displayed in the vertical mode display unit 101 to correspond to a screen size of the horizontal mode display unit 105 and displays the converted music video data in the horizontal mode display unit 105, and provides the horizontal mode input keys 106 to correspond to a horizontal mode input key arrangement. Particularly, because the moving direction 120 of the mobile terminal 100 is counterclockwise, a mode of the mobile terminal 100 is converted to the horizontal mode for the right-handed user 110 (hereinafter, a 'right hand horizontal mode'), and the horizontal mode input keys 106 are arranged accordingly. Thereby, the mobile terminal 100 that can embody both a horizontal mode and a vertical mode provides an optimized interface by detecting an orientation conversion by a user, as shown in FIG. 1A. Particularly, in the horizontal mode shown in FIG. 1A, because a service is provided through an interface of a right hand horizontal mode for the right-handed user 110, a UI corresponding to a user characteristic of the right-handed user 110 is embodied.

Figure 1B:
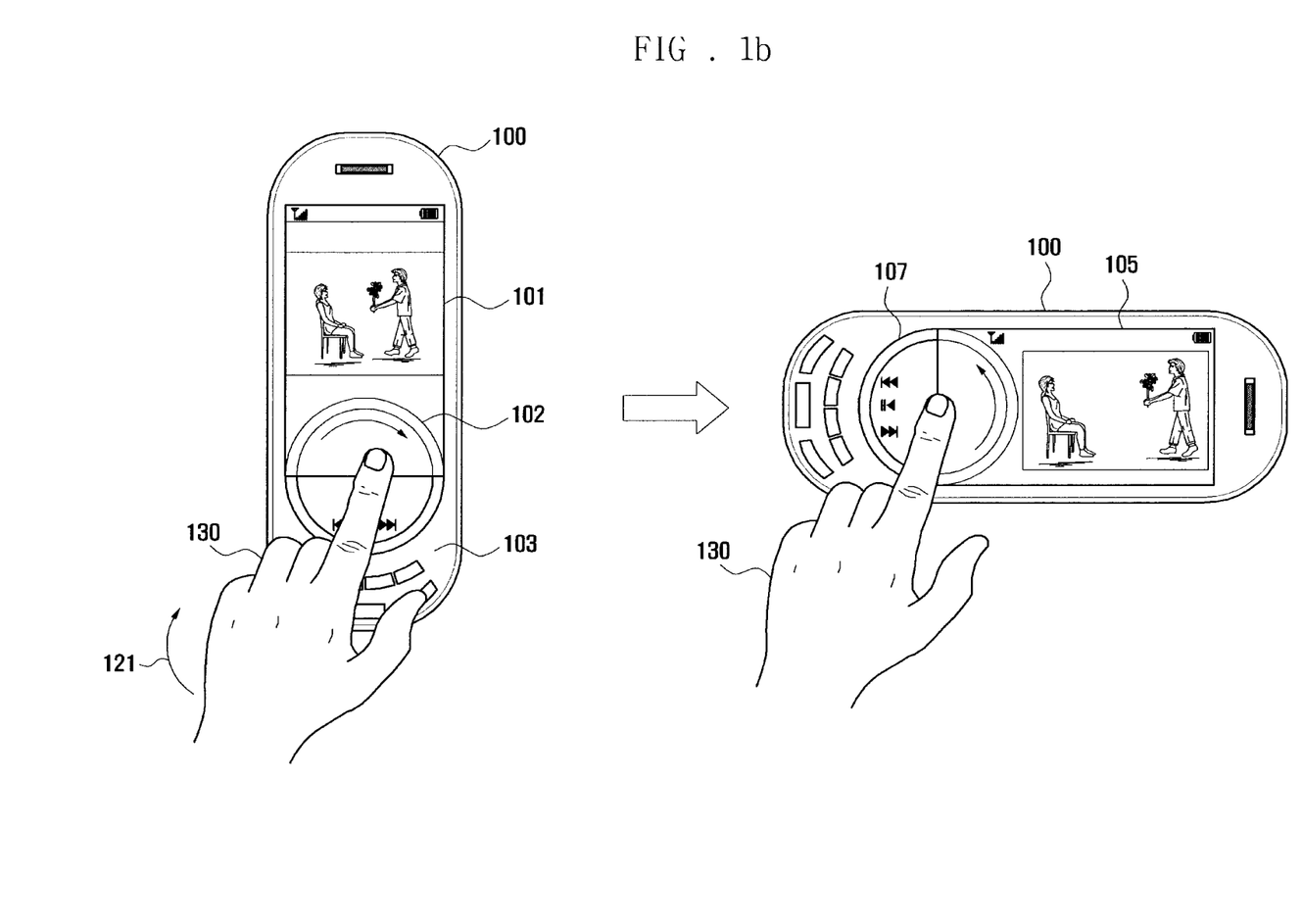
FIG. 1B illustrates an example of converting a user interface corresponding to a user characteristic of a left-handed person according to another exemplary embodiment of the present invention.

FIG. 1B illustrates an example of converting a UI corresponding to a user characteristic of a left-handed person according to an exemplary embodiment of the present invention. In FIG. 1B, the mobile terminal 100 is converted from a state in which the data is displayed in the vertical mode display unit 101 and the vertical mode input keys 102 are arranged in a vertical arrangement, to a state in which the data is displayed in the horizontal mode display unit 105 and input keys 107 of a horizontal mode are arranged in a horizontal arrangement according to an orientation conversion, similarly to FIG. 1A.

Referring to FIG. 1B, the mobile terminal 100 in a vertical mode displays data generated while a requested application is executed to correspond to a screen size of the vertical mode display unit 101 and provides the input keys 102 to correspond to a vertical mode input key arrangement. In this case, the vertical mode input keys 102 can be arranged in a part of the display unit 101 as well as in the touch pad area 103 according to an executed application. In FIG. 1B, the executed application is reproduction of a music video, similarly to FIG. 1A. In a state where data of a music video is displayed through the vertical mode display unit 101 and the vertical mode input keys 102 are arranged, if the mobile terminal 100 in a vertical mode is moved to a horizontal orientation in a moving direction 121 while the mobile terminal 100 is manipulated by a left-handed user 130, the mobile terminal 100 detects the moving direction 121 and converts the mode to a horizontal mode accordingly. That is, data of a music video that was reproduced through the vertical mode display unit 101 in the vertical mode of the mobile terminal 100 prior to the mode conversion is reproduced through the horizontal mode display unit 105, and the mobile terminal 100 converts the arranged vertical mode input keys 102 to an arrangement of the horizontal mode input keys 107. In this case, the mobile terminal 100 detects the moving direction 121, and displays data corresponding to a user characteristic of the left-handed user 130 and arranges the input keys 107 accordingly. When the detected moving direction of the mobile terminal 100 is clockwise, the mobile terminal 100 determines that the user is a right-handed user, and when the detected moving direction of the mobile terminal 100 is clockwise, as in the moving direction 121 in FIG. 1B, the mobile terminal 100 determines that the user is the left-handed user 130.

When the mode of the mobile terminal 100 is converted to the horizontal mode, the mobile terminal 100 converts music video data displayed in the vertical mode display unit 101 to correspond to a screen size of the horizontal mode display unit 105 and displays the converted music video data in the horizontal mode display unit 105, and provides the horizontal mode input keys 107 corresponding to a horizontal mode input key arrangement. Particularly, because the moving direction 121 of the mobile terminal is clockwise, a mode of the mobile terminal 100 is converted to the horizontal mode for the left-handed user 130 (hereinafter, a 'left hand horizontal mode'), data is displayed in the horizontal mode display unit 105, and the horizontal mode input keys 107 are arranged to correspond to the left-handed user 130. Thereby, the mobile terminal 100 that can embody both a horizontal mode and a vertical mode provides an optimized interface by detecting an movement direction by a user, as shown in FIG. 1B. Particularly, in the horizontal mode shown in FIG. 1B, because a service is provided through an interface of a left hand horizontal mode for the left-handed user 130, a UI corresponding to a user characteristic of the left-handed user 130 is embodied. Although not shown in FIGS. 1A and 1B, when an orientation of the mobile terminal 100 is moved from a horizontal orientation to a vertical orientation, by detecting an orientation conversion (movement) of the mobile terminal 100 as described above, a mode of the mobile terminal 100 is converted accordingly. That is, when the mobile terminal 100 in a state of a left hand horizontal mode or a right hand horizontal mode, if movement to a vertical position is detected, a conversion to a vertical mode is performed wherein data is displayed in the vertical mode display unit 101 and the vertical mode input keys 102 are arranged accordingly.

Further, in the case of the vertical mode, in the present embodiment, the same UI is provided without distinguishing between a left-handed user and a right-handed user, however input keys can be provided by classifying into a left hand vertical mode and a right hand vertical mode, similarly to a horizontal mode.

Figure 2A:
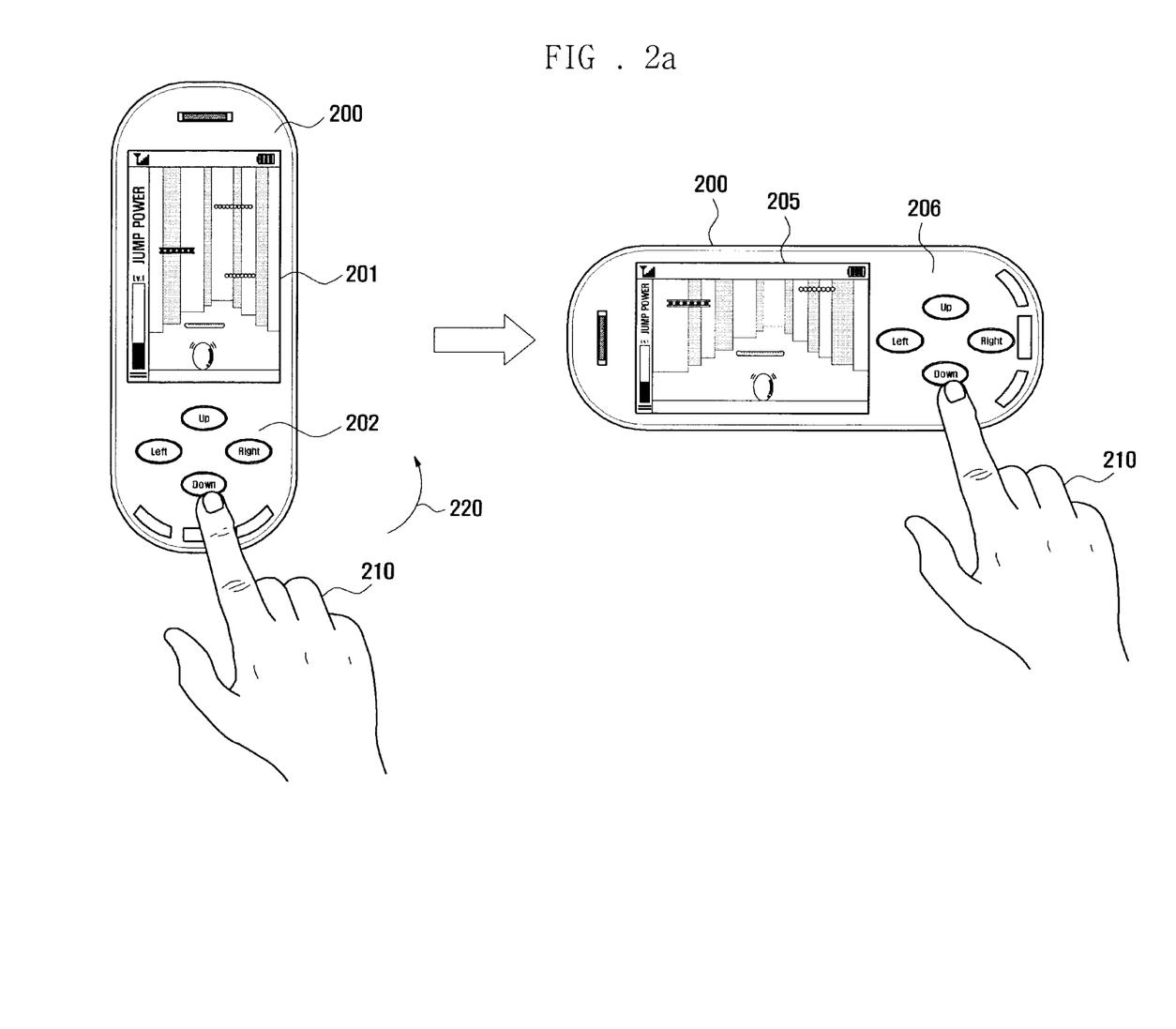
FIG. 2A illustrates an example of converting a user interface corresponding to a user characteristic of a right-handed person according to another exemplary embodiment of the present invention.

FIG. 2A illustrates an example of converting a UI corresponding to a user characteristic of a right-handed person according to another exemplary embodiment of the present invention. In FIG. 2A, a mobile terminal 200 is converted from a state in which data is displayed in a display unit 201 of a vertical mode and input keys 202 of a vertical mode are arranged in a vertical arrangement, to a state in which data is displayed in a display unit 205 of a horizontal mode and input keys 206 of a horizontal mode are arranged in a horizontal arrangement, according to an orientation conversion.

Referring to FIG. 2A, the mobile terminal 200 in a vertical mode displays data generated while a requested application is executed to correspond to a screen size of the vertical mode display unit 201 and provides the input keys 202 to correspond to a vertical mode input key arrangement. In this case, the vertical mode input keys 202 can be arranged in a part of the display unit 201 as well as in a touch pad area according to the executed application. Here, a touch pad area is an area in which the input keys 202 of FIG. 2A are provided, and the input keys 202 include 'up', 'down', 'left', and 'right' keys, and may further include a plurality of keys for providing other functions.

FIG. 2A illustrates a case of executing a game as an example of an executed application, in which the mobile terminal 200 is manipulated in a vertical mode by a right-handed user 210. In a state where game data executed in the mobile terminal 200 is displayed through the vertical mode display unit 201 and the vertical mode input keys 202 are arranged, if the mobile terminal 200 is moved to a horizontal orientation in a moving direction 220, the mobile terminal 200 detects the moving direction 220 and converts the mode to a horizontal mode accordingly. That is, game data that was displayed through the vertical mode display unit 201 in the vertical mode of the mobile terminal 200 prior to the movement is displayed through the horizontal mode display unit 205, and the mobile terminal 200 converts the arranged vertical mode input keys 202 to an arrangement of the horizontal mode input keys 206. In this case, the mobile terminal 200 detects the moving direction 220, and displays data corresponding to a user characteristic of the right-handed user 210 and arranges the input keys 206 accordingly. When the detected moving direction of the mobile terminal 200 is counterclockwise, as in the moving direction 220, shown in FIG. 2A, the mobile terminal 200 determines that the user is the right-handed user 210, and when the detected moving direction of the mobile terminal 200 is clockwise, the mobile terminal 200 determines that the user is a left-handed user (see FIG. 2B).

When the mode of the mobile terminal 200 is converted to the horizontal mode, the mobile terminal 200 converts game data displayed in vertical mode display unit 201 to correspond to a screen size of the horizontal mode display unit 205 and displays the game data in the horizontal mode display unit 205, and provides the horizontal mode input keys 206 to correspond to a horizontal mode input key arrangement. Particularly, because the moving direction 220 of the mobile terminal 200 is counterclockwise, a mode of the mobile terminal 200 is converted to a right hand horizontal mode for the right-handed user 210, data is displayed in the horizontal mode display unit 205, and the horizontal mode input keys 206 are arranged accordingly. The horizontal mode input keys 206 include 'up', 'down', 'left', and 'right' keys, and may further a plurality of keys for providing other functions. As would be recognized, the keys remain in the same relative position to each other before and after the movement of the portable terminal.

Figure 2B:
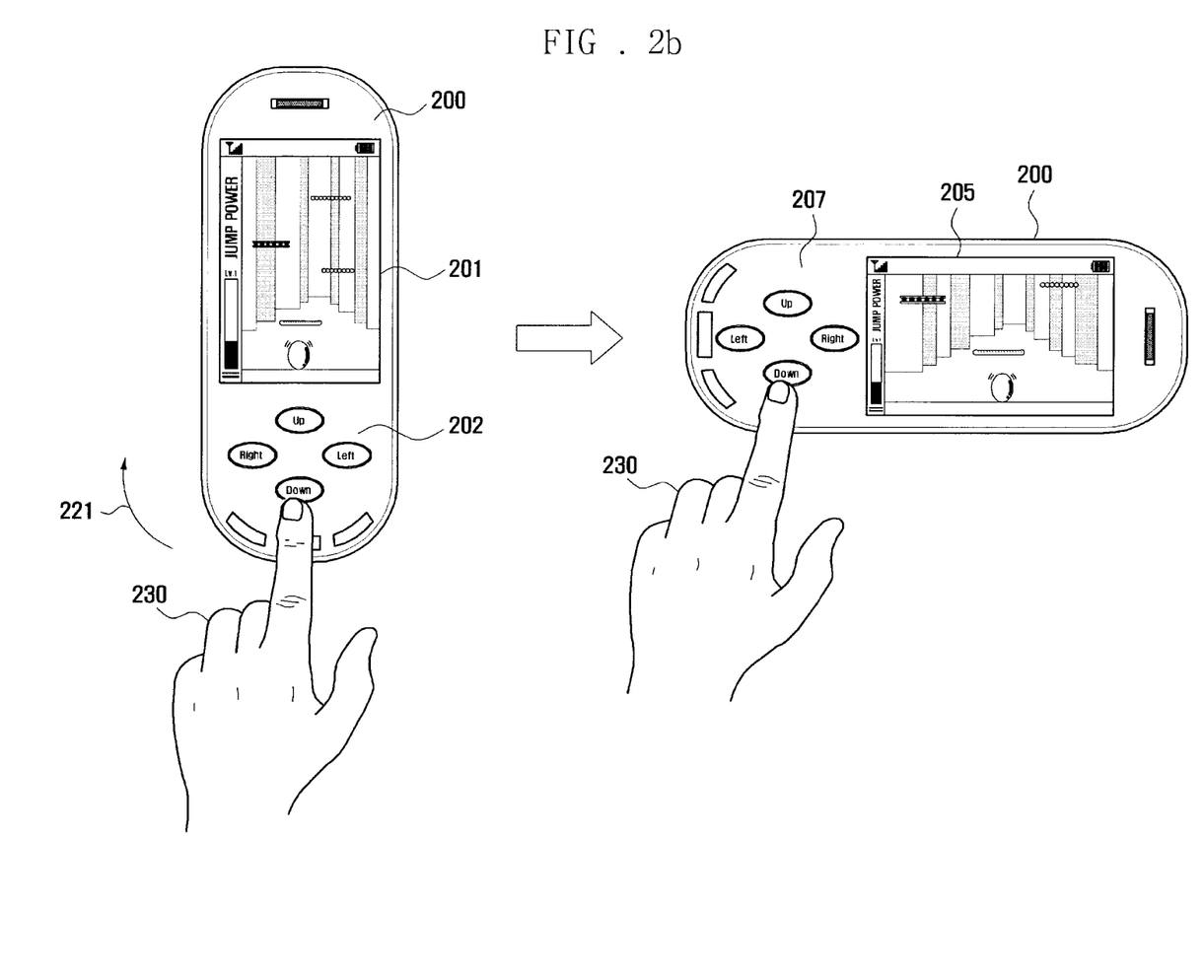
FIG. 2B illustrates an example of converting a user interface corresponding to a user characteristic of a left-handed person according to another exemplary embodiment of the present invention.

FIG. 2B illustrates an example of converting a UI corresponding to a user characteristic of a left-handed person according to an exemplary embodiment of the present invention. In FIG. 2B, the mobile terminal 200 is converted from a state in which data are displayed in the vertical mode display unit 201 and the vertical mode input keys 202 are arranged in a vertical arrangement, to a state in which data is displayed in the horizontal mode display unit 205 and input keys 207 of a horizontal mode are arranged in a horizontal arrangement according to an orientation conversion, similarly to FIG. 2A.

Referring to FIG. 2B, the mobile terminal 200 in a vertical mode displays data generated while a requested application is executed to correspond to a screen size of the vertical mode display unit 201 and provides the vertical mode input keys 202 to correspond to a vertical mode input key arrangement. In FIG. 2B, an executed application is a game, in which the mobile terminal 200 is manipulated in a vertical mode by a left-handed user 230. In a state where game data executed in the mobile terminal 200 is displayed through the vertical mode display unit 201 and the vertical mode input keys 202 are arranged, if the mobile terminal 200 is moved to a horizontal orientation in a moving direction 221 (clockwise), the mobile terminal 200 detects the moving direction 221 thereof and converts the mode to a horizontal mode accordingly. That is, game data that was displayed through the vertical mode display unit 201 in the vertical mode of the mobile terminal 200 prior to the movement is displayed through the horizontal mode display unit 205, and the mobile terminal 200 converts the arranged vertical mode input keys 202 to an arrangement of the horizontal mode input keys 207. In this case, the mobile terminal 200 detects the moving direction 221, and displays data corresponding to a user characteristic of the left-handed user 230 and arranges the input keys 202 accordingly. When the detected moving direction of the mobile terminal 200 is counterclockwise, the mobile terminal 200 determines that the user is a right-handed user, and when the detected moving direction of the mobile terminal 200 is clockwise, as in the moving direction 221, shown in FIG. 2B, the mobile terminal 200 determines that the user is the left-handed user 230.

When the mode of the mobile terminal 200 is converted to the horizontal mode, the mobile terminal 200 converts game data displayed in the vertical mode display unit 201 to correspond to a screen size of the horizontal mode display unit 205 and displays the game data in the horizontal mode display unit 205, and provides the horizontal mode input keys 207 to correspond to a horizontal mode input key arrangement. Particularly, because the moving direction 221 of the mobile terminal 200 is clockwise, a mode of the mobile terminal 200 is converted to a left hand horizontal mode for the left-handed user 230, data is displayed in the horizontal mode display unit 205, and the horizontal mode input keys 207 are arranged to correspond to the left-handed user 230. Although not shown in FIGS. 2A and 2B, when an orientation of the mobile terminal 200 is moved from a horizontal orientation mode to a vertical orientation, by detecting a movement of the mobile terminal 200, a mode of the mobile terminal 200 is converted accordingly. That is, when a mode of the mobile terminal 200 from a left hand horizontal mode or a right hand horizontal mode to a vertical mode, data is displayed in the vertical mode display unit 201 and the vertical mode input keys 202 are arranged. Further, in the case of the vertical mode, in the present embodiment, a case of providing the same UI without distinguishing between a left-handed user and a right-handed user is exemplified. However input keys can be provided by classifying into a left hand vertical mode and a right hand vertical mode, similarly to a horizontal mode. Thereby, instead of providing a uniform UI according to a specific application or function, a UI can be provided according to a user characteristic.

A configuration of the mobile terminals 100 and 200 for embodying the above described examples is described in detail with reference to FIG. 3.

Figure 3:
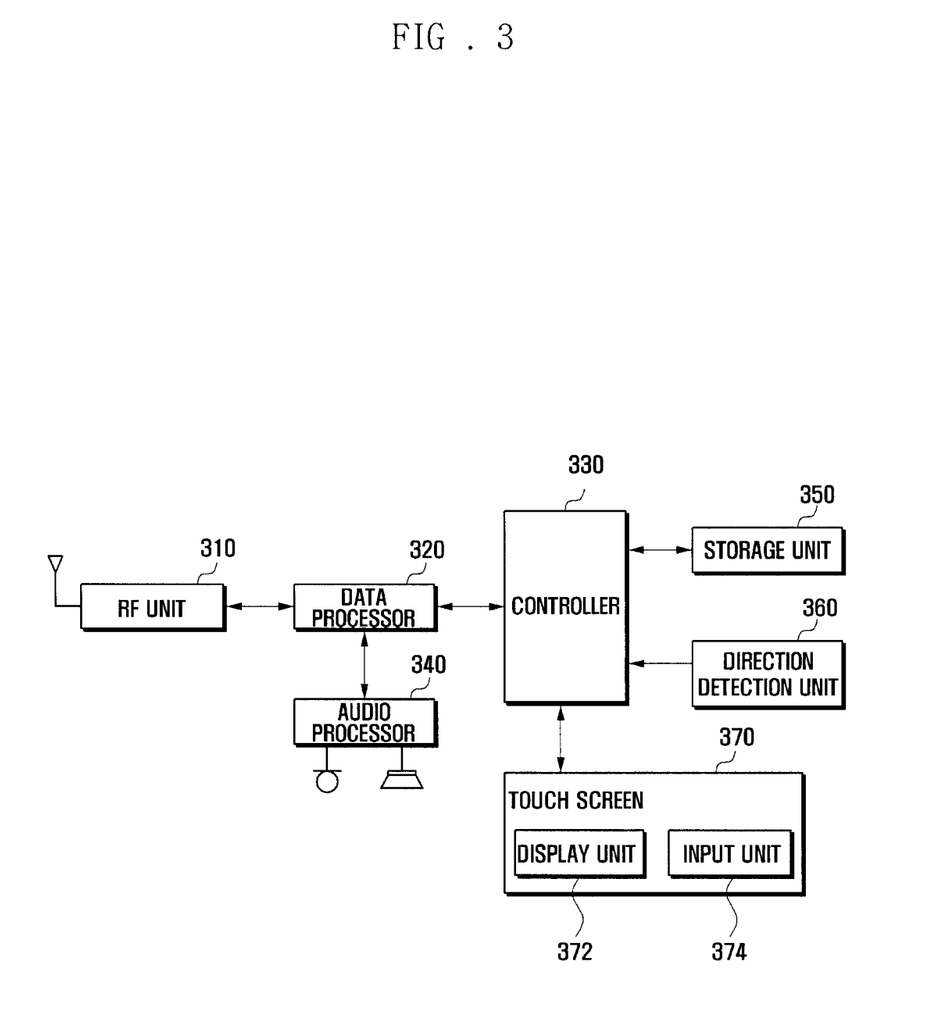
FIG. 3 illustrates a block diagram of a mobile terminal according to an exemplary embodiment of the present invention.

FIG. 3 is a block diagram illustrating a configuration of a mobile terminal according to another exemplary embodiment of the present invention.

The mobile terminal of FIG. 3 is embodied as a mobile communication terminal and a configuration of the mobile communication terminal is described. However further elements can be added to the described elements of the mobile terminal of FIG. 3 without altering the scope of the invention. The mobile terminal of the present invention is not limited to the mobile communication terminal, and can be any terminal having a sensor for detecting an orientation conversion. For example, the mobile terminal may be a Personal Digital Assistant (PDA) or an iTouch type device, iTouch is a registered Trademark of Apple Computer Co., Inc., of Cupertino, Calif.

Referring to FIG. 3, the mobile terminal includes a radio frequency (RF) unit 310, data processor 320, controller 330, audio processor 340, storage unit 350, direction detection unit 360, and touch screen 370.

The RF unit 310 performs wireless communication with a base station (not shown) while transmitting and receiving a wireless signal. For this, the RF unit 310 transmits a digital signal through an antenna by base-band converting, amplifying, and up-converting a signal, and converts a signal received through the antenna to a digital signal through down-converting and amplifying and outputs the signal.

The data processor 320 processes data output from the RF unit 310, numeral/character data input through an input unit 374 of the touch screen 370 by a user, and sound data output from the audio processor 340. The data processor 320 includes a transmitter for encoding and modulating a signal to be transmitted, and a receiver for demodulating and decoding a received signal. That is, the data processor 320 includes a modem and codec. The codec includes a codec for processing packet data and an audio codec for processing audio data.

The audio processor 340 reproduces audio data output from the audio codec of the data processor 320 through a speaker, SPK, and outputs audio data input through a microphone, MIC, to the data processor 320.

The controller 330 controls general operations of the mobile terminal and a signal flow between units. The controller 330 may perform a function of the data processor 320. Further, the controller 330 provides controls of display data in a vertical mode or a horizontal mode according to a direction detected by the direction detection unit 360 and to arrange input keys, appropriately, when a mode of the mobile terminal is converted from a vertical mode to a horizontal mode. The controller 330 determines whether the movement of the terminal is associated with a left hand horizontal mode or a right hand horizontal mode and controls to arrange input keys and to display data accordingly.

The storage unit 350 stores a program and data for performing various functions of the mobile terminal. Further, the storage unit 350 stores information for displaying data, such as a moving direction and key arrangement in a vertical mode or a horizontal mode, particularly in a left hand horizontal mode or a right hand horizontal mode, and for providing the appropriate positioning and orientation of the input keys.

The direction detection unit 360 detects a movement between a horizontal mode and a vertical mode and more specifically whether the movement is between a left hand horizontal mode and a right hand horizontal mode. The direction detection unit 360 detects a default mode in which the mobile terminal starts operation and a direction moved from the default mode while performing operation. In the present exemplary embodiment, a vertical mode, a left hand horizontal mode, and a right hand horizontal mode are exemplified, and thus the direction detection unit 360 detects a direction corresponding to a default mode of starting operation of the mobile terminal among the three modes, and detects a direction converted from the default mode. In order to detect a direction of the mobile terminal, the direction detection unit 360 may have at least one of a gyroscope sensor and an acceleration sensor, and may have other sensors in addition to a gyroscope sensor or an acceleration sensor.

The touch screen 370 includes a display unit 372 and the input unit 374. The touch screen 370 performs a function of a display unit and an input unit, and the display unit 372 displays data generated while operating the mobile terminal. The display unit 372 may include a liquid crystal display (LCD), and in this case, the display unit 372 includes an LCD controller, buffer, and LCD display element. Further, the display unit 372 displays data to correspond to different screen sizes according to a horizontal mode or a vertical mode and displays data to correspond to a screen direction according to a left hand horizontal mode or a right hand horizontal mode.

The input unit 374 receives an input by detecting a touch by a user on a display unit screen or a touch pad and outputs an input signal corresponding to an area touched by the user to the controller 330. In order to detect a touch, the input unit 374 can have a touch sensor. The input unit 374 provides input key arrangement classified according to a vertical mode or a horizontal mode, particularly a left hand horizontal mode or a right hand horizontal mode, under the control of the controller 330, and outputs a corresponding input signal to the controller 330 by detecting an area touched by the user.

Figure 4:
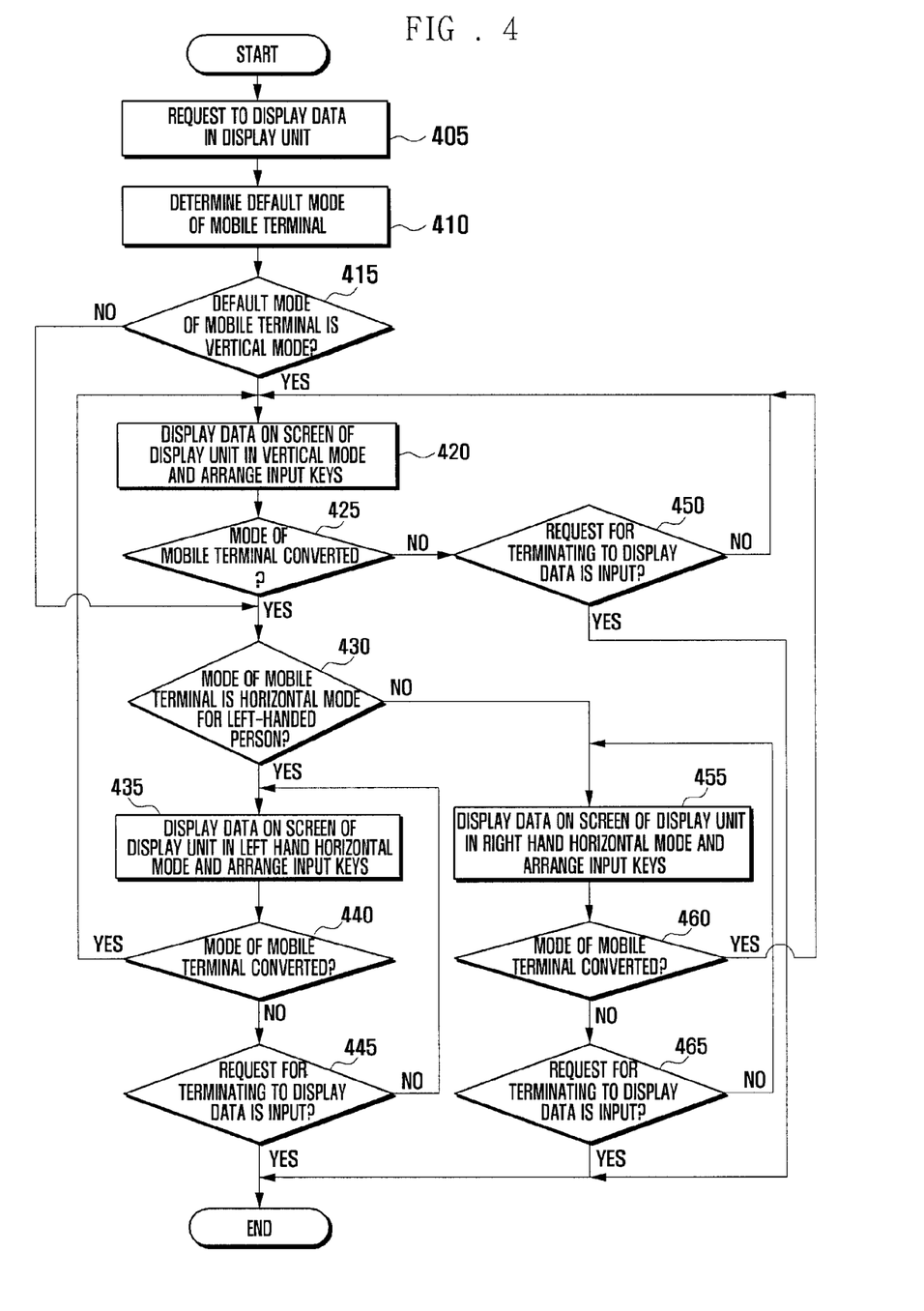
FIG. 4 is a flowchart illustrating a method of providing a user interface based on a user characteristic according to an exemplary embodiment of the present invention.

FIG. 4 is a flowchart illustrating a method of providing a UI based on a user characteristic according to another exemplary embodiment of the present invention.

Referring to FIG. 4, the controller 330 determines that a request for displaying data in the display unit 372 is input by a user (405). Here, a request for displaying data indicates all states in which data display is requested through a screen of the display unit 372 when an LCD of the display unit 372 is turned on.

The controller 330 determines a default mode of the mobile terminal according to a direction detected by the direction detection unit 360 (410). The default mode can be classified as one of a horizontal mode and a vertical mode, and the horizontal mode can be further classified as one of a left hand horizontal mode for a left-handed user and a right hand horizontal mode for a right-handed user. A direction of the mobile terminal is detected by a gyroscope sensor of the direction detection unit 360, by which the default mode is determined. Further, when the default mode is determined to be a horizontal mode, the data is displayed and input keys are arranged in one of a left hand horizontal mode and a right hand horizontal mode set to a default mode. The default mode can be set by a user, or can be automatically set according to a user's use history of the mobile terminal.

A block 415, the controller 330 determines whether the default mode of the mobile terminal is the vertical mode.

If the default mode of the mobile terminal 100 is the vertical mode, the controller 330 controls to display requested data to correspond to a screen of the display unit 372 in a vertical mode and arranges the input keys in a vertical mode (420). The corresponding vertical mode display units 101 and 201 and vertical mode input keys 102 and 202 of the mobile terminals 100 and 200, respectively, are shown in FIGS. 1A to 2B.

The controller 330 determines whether a mode of the mobile terminal 100 or 200 is converted, i.e. whether a direction of the mobile terminal 100 or 200 is changed (425). In this case, a mode conversion of the mobile terminal can be determined by detecting a moving direction of the mobile terminal using an acceleration sensor of the direction detection unit 360.

If a mode of the mobile terminal is not converted, the controller 330 determines whether a request for terminating to display data in the display unit is input (450). If a request for terminating to display data is input, the process is terminated. If a request for terminating display data is not input, the process returns to step 420.

If a mode of the mobile terminal is converted at step 425, or if the default mode of the mobile terminal is not a vertical mode (i.e. if the default mode of the mobile terminal is a horizontal mode), the controller 330 determines whether the mode of the mobile terminal is a horizontal mode for a left-handed user (430). In this case, the mobile terminal determines whether the mode is a horizontal mode for a left-handed user according to a moving direction detected by the direction detection unit 360. When the detected moving direction of the mobile terminal is counterclockwise, a mode of the mobile terminal is determined as a right hand horizontal mode for a right-handed user, and when the detected moving direction of the mobile terminal is clockwise, a mode of the mobile terminal is determined as a left hand horizontal mode for a left-handed user. If the mode of the mobile terminal is a left hand horizontal mode, the controller 330 displays requested data in a direction corresponding to a screen of the display unit in the left hand horizontal mode and arranges the input keys in the left hand horizontal mode (435). See for example, the corresponding horizontal mode display units 105 and 205 and input keys 107 and 207 of the mobile terminals 100 and 200, respectively, are shown in FIGS. 1B and 2B. If a default mode of the mobile terminal is determined to be a horizontal mode, data are displayed and input keys are arranged in a horizontal mode set to a default mode out of a left hand horizontal mode and a right hand horizontal mode.

The controller 330 next determines whether a mode conversion (movement) of the mobile terminal is detected by the direction detection unit 360 (440). If a mode conversion of the mobile terminal is detected, the process returns to step 420. If a mode conversion of the mobile terminal is not detected, the controller 330 determines whether a request for terminating to display data is input (445).

If a request for terminating to display data is input, the process is terminated, and if a request for terminating to display data is not input, the process returns to step 435.

If the mode of the mobile terminal is not a left hand horizontal mode at step 430, i.e. if the mode of the mobile terminal is a right hand horizontal mode, the controller 330 controls to display requested data in a direction corresponding to a screen of the display unit 372 in the right hand horizontal mode and arranges the input keys in the right hand horizontal mode (455). See, for example, the corresponding horizontal mode display units 105 and 205 and input keys 106 and 206 of the mobile terminals 100 and 200, respectively, are shown in FIGS. 1A and 2A.

The controller 330 next determines whether a mode conversion of the mobile terminal is detected by the direction detection unit 360 (460). If a mode conversion (movement) of the mobile terminal is detected, the process returns to step 420. If a mode conversion of the mobile terminal is not detected, the controller 330 determines whether a request for terminating to display data in the display unit is input (465). If a request for terminating to display data is input, the process is terminated, and if a request for terminating to display data is not input, the process returns to step 455.

In the foregoing description, although only a conversion from a vertical mode to a horizontal mode and a conversion from a horizontal mode to a vertical mode are described, a conversion from a left hand horizontal mode directly to a right hand horizontal mode, and a conversion from a right hand horizontal mode directly to a left hand horizontal mode, can also be performed. In this case, after a mode of the mobile terminal is converted from a left hand horizontal mode or a right hand horizontal mode to a vertical mode, upon detecting a further moving direction while in the vertical mode, data are displayed and input keys are arranged in the corresponding horizontal mode.

Thereby, in the present invention, input keys as well as data displayed in a display unit in a mobile terminal having a horizontal mode and vertical mode are provided according to a horizontal mode or a vertical mode. Further, input keys as well as data displayed in the display unit can be provided according to a left-handed user or a right-handed user, i.e. according to user characteristic.

As described above, according to the present invention, because a customized interface and a physical user interface according to a user characteristic can be provided, user convenience and user satisfaction can be improved.

Further, a physical user interface is provided that enables a user to conveniently use an input device and an output device in a mobile terminal without distinguishing between a left-handed person and a right-handed person.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. As would be recognized by those skilled in the art, when a general purpose computer is loaded with, or accesses, software or code for implementing the processing shown herein, the general purpose computer is transformed into a special purpose computer that may at least perform the processing shown herein.

Although exemplary embodiments of the present invention have been described in detail hereinabove, it should be clearly understood that many variations and modifications of the default inventive concepts herein described, which may appear to those skilled in the art, will still fall within the spirit and scope of the exemplary embodiments of the present invention as defined in the appended claims.

What is claimed is:

1. A method of providing a user interface in a terminal, comprising:
   detecting a orientation conversion of the terminal from the vertical orientation to a left hand horizontal orientation or a right hand horizontal orientation;
   providing an input key arrangement corresponding to one of the left hand horizontal orientation and the right hand horizontal orientation according to the detected orientation conversion; and
   displaying data corresponding to a screen orientation conversion of the display unit corresponding to the orientation conversion of the terminal,
   wherein a controller operates the display unit and the input key unit in either a vertical mode or a horizontal mode according to an output received from a direction detection unit, and wherein when in a horizontal mode the controller further provide a different physical user interface (PUI) according to a user's characteristics.

2. The method of claim 1, wherein when the display unit is in one of the left hand horizontal orientation and the right hand horizontal orientation, a horizontal dimension of a screen of the display unit is greater than a vertical dimension thereof, and when the display unit is in the vertical orientation, the vertical dimension of the display unit screen is greater than the horizontal dimension thereof.

3. The method of claim 1, wherein when the terminal is in the left hand horizontal orientation, the input keys are arranged corresponding to manipulation by a left hand of a user, and when the terminal is in the right hand horizontal orientation, the input keys are arranged corresponding to manipulation by a right hand of a user.

4. The method of claim 1, further comprising displaying, when the orientation of the terminal is converted from one of the left hand horizontal orientation and the right hand horizontal orientation to the vertical orientation, data to correspond to the screen orientation of the display unit in the vertical orientation and providing the input key arrangement corresponding to the vertical orientation.

5. The method of claim 1, further comprising:
   determining, when a request for data display is input, a orientation of the terminal; and
   displaying, when the detected orientation of the mobile terminal is the vertical orientation, data to correspond to the screen orientation of the display unit in the vertical orientation and providing the input key arrangement corresponding to the vertical orientation.

6. The method of claim 1, further comprising:
   determining, when a request for data display is input, a orientation of the terminal; and
   providing, when the determined orientation of the terminal is one of the left hand horizontal orientation and the right hand horizontal orientation, an input key arrangement corresponding to a preset horizontal orientation in one of a left hand horizontal orientation and a right hand horizontal orientation and displaying data to correspond to a screen orientation of a display unit of the left hand horizontal orientation and the right hand horizontal orientation.

7. A terminal comprising:
   a display unit for displaying data on a screen thereof with different screen orientations corresponding to a horizontal orientation and a vertical orientation;
   an input unit for providing different input key arrangements corresponding to the vertical orientation, a left hand horizontal orientation, and a right hand horizontal orientation;
   a detection unit for detecting an orientation conversion of the terminal from the vertical orientation to the left hand horizontal orientation or the right hand horizontal orientation; and
   a controller for controlling the display unit to display data to correspond to a screen orientation conversion corresponding to the detected orientation conversion; and for controlling the display unit to provide an input key arrangement corresponding to the detected orientation conversion,
   wherein a controller operates the display unit and the input key unit in either a vertical mode or a horizontal mode according to an output received from a direction detection unit, and wherein when in a horizontal mode the controller further provide a different physical user interface (PUI) according to a user's characteristics.

8. The terminal of claim 7, wherein when the display unit is in the horizontal orientation, a horizontal dimension of the screen of the display unit is greater than a vertical dimension thereof, and when the display unit is in the vertical orientation, the vertical dimension of the display unit screen is greater than the horizontal dimension thereof.

9. The terminal of claim 7, wherein when the orientation of the terminal is converted from the vertical orientation to the horizontal orientation, the controller determines whether the orientation of the terminal is converted to the left hand horizontal orientation or to the right hand horizontal orientation.

10. The terminal of claim 9, wherein when the terminal is in the left hand horizontal orientation, the input unit provides an input key arrangement corresponding to manipulation by a left hand of a user, and when the terminal is in the right hand horizontal orientation, the input unit provides an input key arrangement corresponding to manipulation by a right hand of a user.

11. The terminal of claim 7, wherein when the terminal is in the horizontal orientation, the display unit displays data in a direction corresponding to the determined orientation of the left hand horizontal orientation and the right hand horizontal orientation on the screen in the horizontal orientation.

12. The terminal of claim 10, wherein the detection unit comprises at least one of a gyroscope sensor and an acceleration sensor for detecting a conversion between the horizontal orientation and the vertical orientation and between the left hand horizontal orientation and the right hand horizontal orientation.

13. The terminal of claim 7, wherein when a request for data display is input, the controller determines an orientation of the terminal detected by the detection unit, controls to display data to correspond to a corresponding screen orientation through the display unit, and controls to provide a corresponding key arrangement of the input unit.

* * * * *

UNITED STATES PATENT AND TRADEMARK OFFICE
CERTIFICATE OF CORRECTION

| | | |
|---|---|---|
| PATENT NO. | : 8,761,691 B2 | |
| APPLICATION NO. | : 12/635835 | |
| DATED | : June 24, 2014 | |
| INVENTOR(S) | : Young Sik Park | |

It is certified that error appears in the above-identified patent and that said Letters Patent is hereby corrected as shown below:

In the Claims

Column 12, Claim 5, Lines 6-7 should read as follows:
--...of the terminal is...--

Column 12, Claim 6, Lines 12-13 should read as follows:
--...input, an orientation of...--

Signed and Sealed this
Second Day of September, 2014

Michelle K. Lee
*Deputy Director of the United States Patent and Trademark Office*